T. J. Penny,
Nut Wrench.

N° 37,920.      Patented Mar. 17, 1863.

Witnesses            Inventor
J. W. Coombs           T. J. Penny
G. W. Reed           per Munn & Co.
                                     Attorneys

UNITED STATES PATENT OFFICE.

THOMAS J. PENNY, OF WOOSTER, OHIO.

IMPROVED COMBINED WRENCH, SCRAPER, AND SCREW-DRIVER.

Specification forming part of Letters Patent No. 37,920, dated March 17, 1863.

*To all whom it may concern:*

Be it known that I, T. J. PENNY, of Wooster, in the county of Wayne and State of Ohio, have invented a new and useful combination of a Wrench, Scraper, and Screw-Driver; and I do hereby declare that the following is a full, clear, and exact description of the same, reference being had to the accompanying drawings, making a part of this specification, in which—

Figure 1:
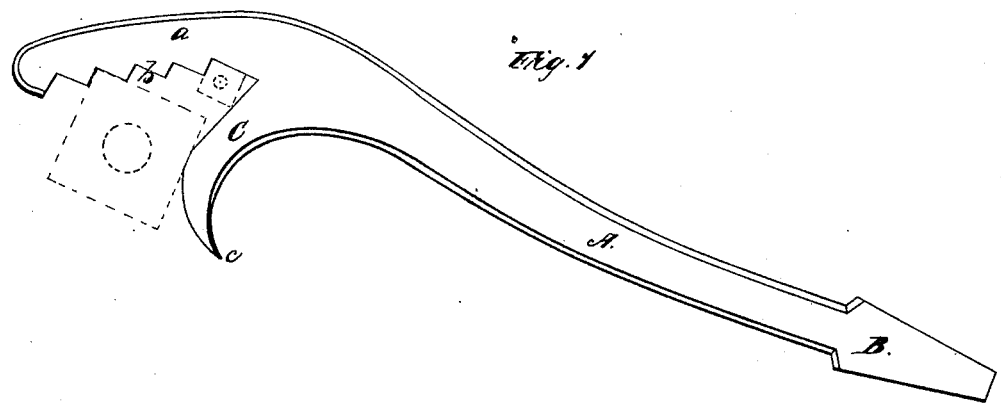
Figure 2:
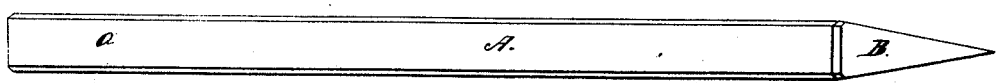

Figure 1 is a side view of my invention; Fig. 2, an edge view of the same.

Similar letters of reference indicate corresponding parts in the two figures.

This invention consists in combining a wrench, scraper, and screw-driver all in one implement, so that the latter may be used in any of the above-named capacities, and answer equally as well as if made specially for any of the particular purposes specified.

To enable those skilled in the art to fully understand and construct my invention, I will proceed to describe it.

A represents a metal bar, which is slightly curved in serpentine form, and has one end, B, flattened or tapered to form a screw-driver. The opposite end of said bar is rounded or curved, as shown at *a* in Fig. 1, and is notched or serrated transversely at its concave side, as shown at *b*. The bar A has also a curved projection, C, extending from it at the inner end of the serrated side of *a*. The projection C is perfectly smooth, both at its convex and concave sides, the convex side being opposite the serrated side of *a*, as shown in Fig. 1. The projection C is gradually tapered to a sharp or cutting edge, *c*, which serves as a scraper, the curve of the projection C giving a proper position to said edge *c* relatively with the bar A, so that the implement may be used as an ordinary box-scraper, such as is used for removing names or directions from boxes, barrels, &c. The part *a* of the bar A and projection C form jaws of a wrench, which is capable of operating upon different-sized nuts. (See Fig. 1, in which two nuts of different sizes are shown in red outline.)

This implement may be forged out of a steel or iron bar, or it may be made of malleable cast-iron. It may be manufactured at a small cost, and will, it is believed, prove to be a useful tool for those who have occasion to use the different articles embraced or combined in its construction.

Having thus described my invention, I claim as new, and desire to secure by Letters Patent as an improved article of manufacture—

A combined wrench, scraper, and screw-driver, constructed substantially as herein set forth.

THOMAS J. PENNY.

Witnesses:
HENRY LEHMAN,
GEO. H. LEHMAN.